United States Patent [19]

Snider

[11] Patent Number: 4,596,263

[45] Date of Patent: Jun. 24, 1986

[54] APPARATUS FOR CONTROLLING HYDRAULIC FLOW OF LIQUID UNDER PRESSURE IN A PIPELINE

[76] Inventor: James A. Snider, 579 Flores Ct., Fairfield, Calif. 94533

[21] Appl. No.: 557,839

[22] Filed: Dec. 5, 1983

[51] Int. Cl.⁴ .............................................. F16K 17/14
[52] U.S. Cl. ................... 137/68.1; 137/512.2; 137/513.3; 137/493.3
[58] Field of Search ............... 137/68 R, 512.2, 513.3, 137/493.3, 493.4, 493.5

[56] References Cited

U.S. PATENT DOCUMENTS

| 1,036,479 | 8/1912 | Flamm ............................ 137/513.3 |
| 2,578,590 | 12/1951 | Perrault ........................... 137/493.5 |
| 4,127,142 | 11/1975 | Snider ............................. 137/68 R |

FOREIGN PATENT DOCUMENTS 562923  9/1923  France ............................. 137/493.4

*Primary Examiner*—Harold W. Weakley
*Attorney, Agent, or Firm*—Flehr, Hohbach, Test, Albritton & Herbert

[57] ABSTRACT

The present invention provides a dual valve apparatus for controlling hydraulic flow of liquid under pressure in a pipeline and which closes off the flow of liquid in a manner which minimizes surge pressure in the pipeline. The dual valve apparatus comprises a check valve of the swing-flap type with a pressure relief valve mounted in the check valve member.

2 Claims, 4 Drawing Figures

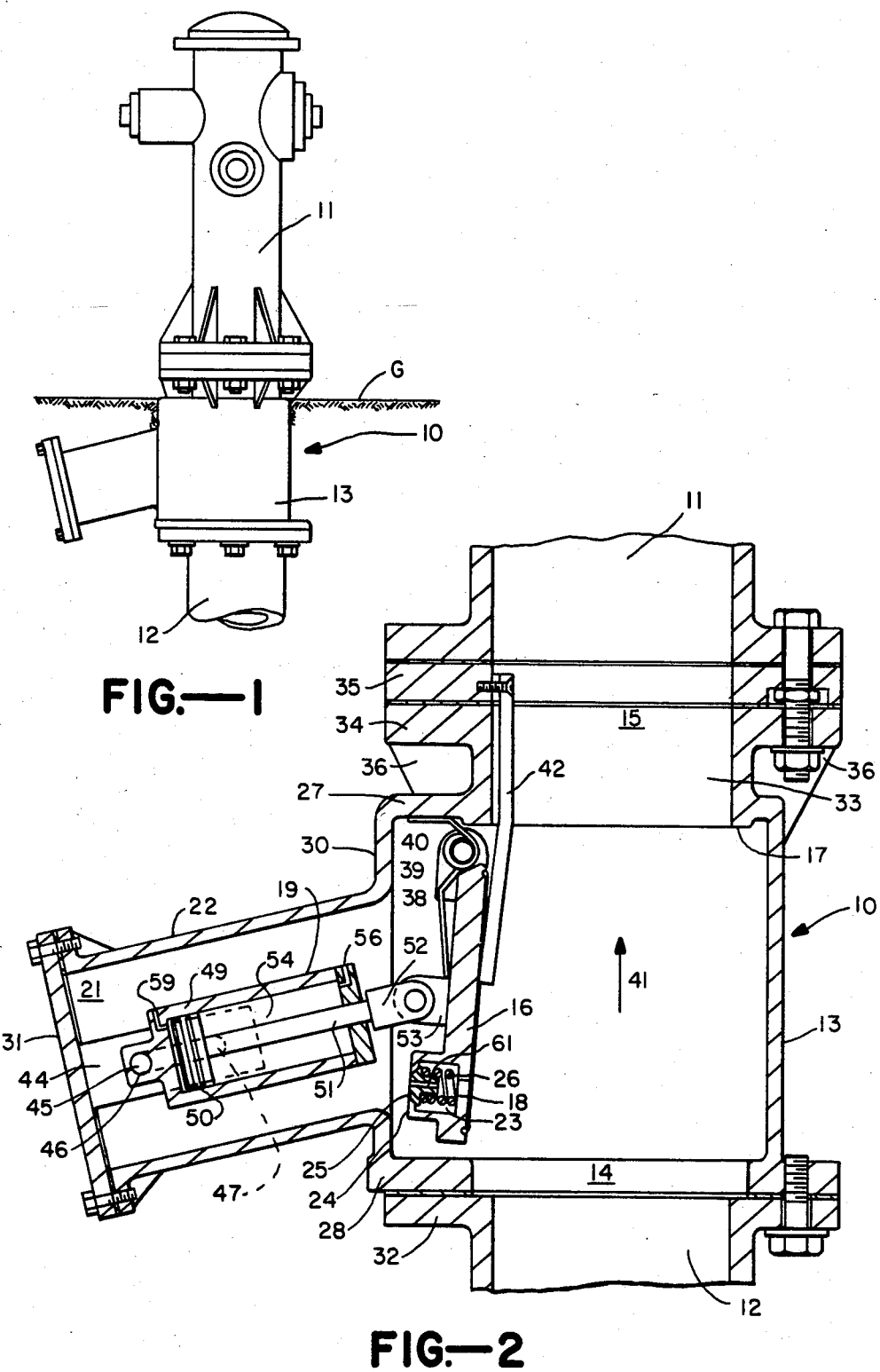
FIG.—1
FIG.—2

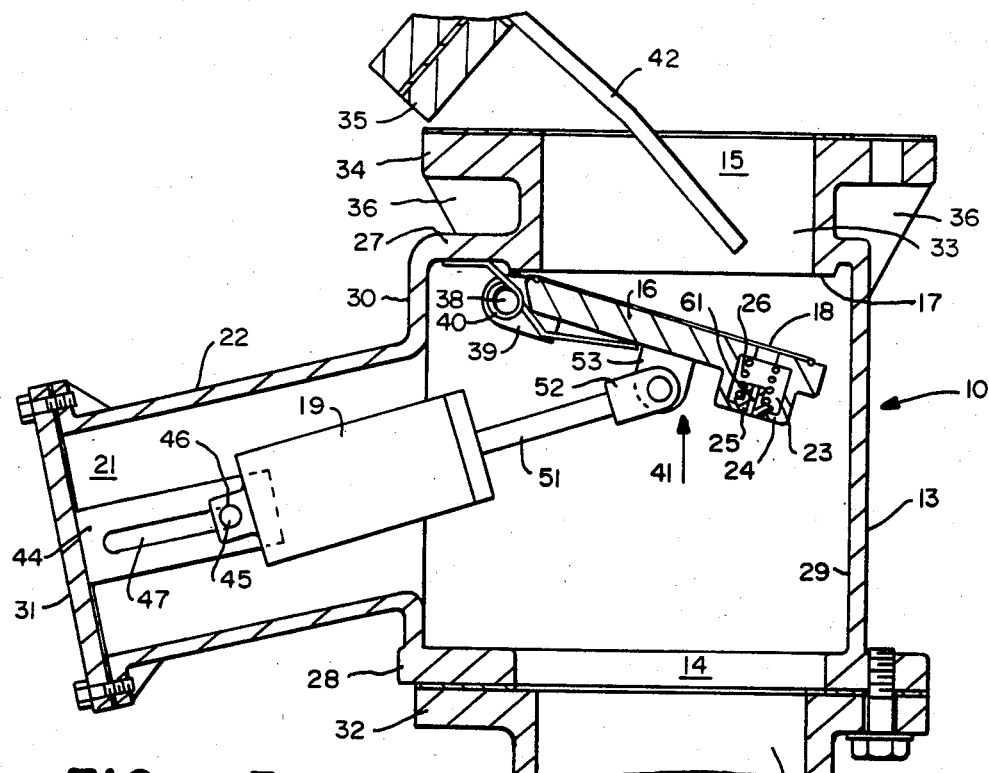
FIG.—3
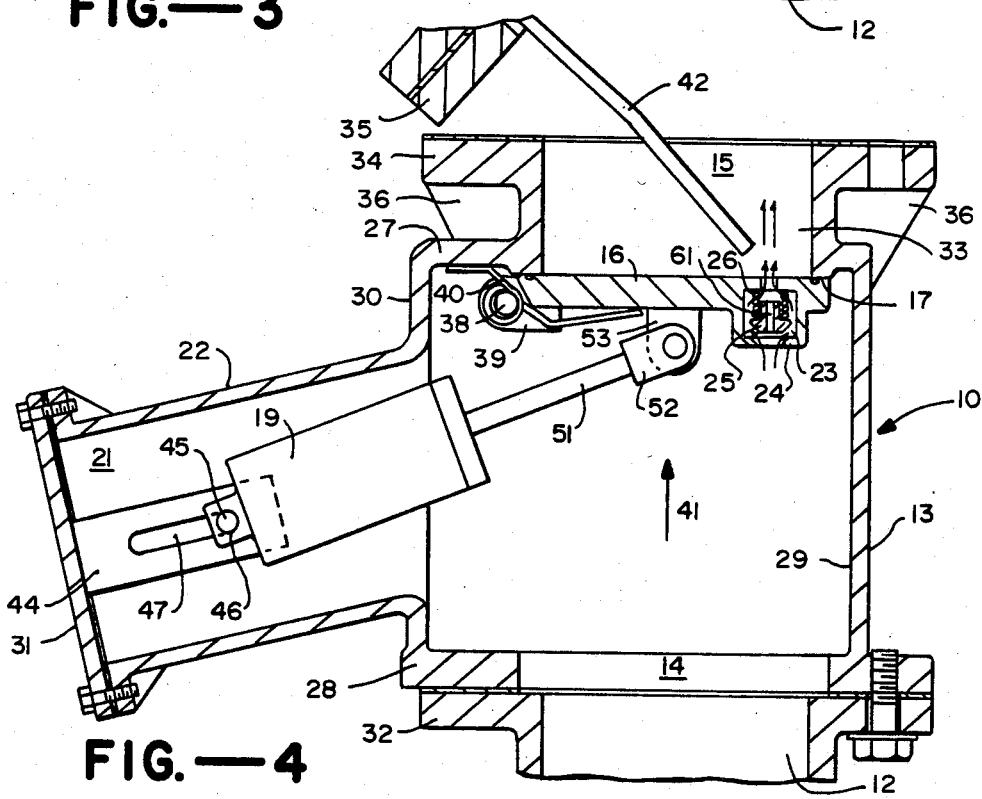
FIG.—4

APPARATUS FOR CONTROLLING HYDRAULIC FLOW OF LIQUID UNDER PRESSURE IN A PIPELINE

The present invention relates to a dual valve apparatus for controlling hydraulic flow of liquid under pressure in a pipeline and which closes off the flow of liquid in a manner which minimizes surge pressure in the pipeline. Specifically, the present invention relates to a dual valve apparatus connected between a wet barrel hydrant and a pipeline containing water under pressure which, when the hydrant is destroyed or disabled, closes off the uncontrolled flow of water therefrom in a manner which minimizes water hammer in the piping.

In mild climates where ground freezing temparatures are rare and of short duration, the underground fire protection system of a municipality may employ fire hydrants having a manual shut-off valve located above ground. In this situation, the hydrant itself holds water at the system pressure which may be in the range of 50 to 150 pounds per square inch. These hydrants are called wet barrel hydrants because a full head of water is always contained within them.

On occasion, fire hydrants are damaged from impact by motor vehicles and frequently hydrants are sheared completely off the hydrant riser. To contain the resulting geyser as well as to conserve water in the system, automatic shut-off valves are provided in wet barrel hydrants, and these have been constructed along the principles taught in U.S. Pat. No. 2,054,561, issued on Sept. 15, 1936. That patent discloses a breakable rod recessed into the inside wall of the hydrant structure to hold a flapper-type check valve under spring bias in the non-operative position. If the hydrant is sheared from its support, the rod breaks to release the flapper-type check valve which is urged by the spring into the outrushing water flow and will thus slam the flapper against the valve seat very rapidly to halt the water flow. The abrupt closing of the flap valve member produces an enormous water hammer in the system and is known to have caused breakage in lines connected in the system.

In U.S. Pat. No. 4,127,142, issued Nov. 28, 1978 to the present inventor, there is disclosed a flapper-type check valve and a dash-pot assembly means mounted within the valve body acting between the valve body and the valve member to permit a controlled valve closure action thereby minimizing water hammer in the line.

The present invention comprises a flapper-type check valve of the general type disclosed in U.S. Pat. No. 4,127,142 and a pressure relief valve mounted on the check valve member such that when the check valve member closes, the pressure relief valve serves to bypass liquid in the check valve body through the closed check valve member in response to hydraulic surge pressure substantially greater than the normal pressure in the upstream piping, thereby minimizing surge pressure in the piping.

It is a general object of the present invention to provide an apparatus for controlling hydraulic flow of liquid under pressure in a pipeline which serves to reduce damaging surge pressure in the pipeline.

A specific object of the present invention is to provide a dual valve apparatus for controlling the hydraulic flow of water under pressure from piping connected to a wet barrel hydrant, such that when the hydrant is destroyed or disabled, the dual valve apparatus closes off the uncontrolled flow of water in a manner which reduces the water hammer in the system.

Other objects and advantages of the invention will be apparent from the following detailed description taken in conjunction with the accompanying drawings.

FIG. 1 is an elevational view of the present invention connected between a wet barrel hydrant and a hydrant riser.

FIG. 2 is an enlarged, vertical sectional view along the longitudinal center line of the structure in FIG. 1.

FIG. 3 is a view like FIG. 2 but illustrates a first sequence of movement when the present invention becomes operative.

FIG. 4 is a view like FIG. 3 but illustrates a second sequence of movement when the present invention becomes operative.

The apparatus for controlling hydraulic flow of liquid under pressure in a pipeline according to the present invention comprises a check valve of the swing flap type adapted to be connected between upstream and downstream piping and a pressure relief valve. The check valve has a valve body with an inlet port for connection to upstream piping and an outlet port for connection to downstream piping defining a flow passageway through the body, a valve seat in the valve body surrounding the flow passageway, a valve member of the flap type pivotally mounted in the valve body and disposed out of the flow passageway. The valve member is pivotal from a position out of the flow passageway to a closed position against the valve seat. The pressure relief valve is mounted on the valve member and serves to bypass liquid in the valve body through the closed valve member in response to hydraulic surge pressure substantially greater than the normal pressure in the upstream piping. Thus, the pressure relief valve minimizes surge pressure in the piping caused by the closure of the check valve member. The apparatus preferably includes resisting means, such as a dash-pot assembly, mounted within the valve body out of the flow passageway. The resisting means acts between the valve body and the valve member to permit controlled valve closure action.

A preferred embodiment of the present invention is shown in FIG. 1 in association with a wet barrel hydrant 11 and piping 12, known as a hydrant riser. The hydrant riser 12 is shown fragmentarily but represents a portion of a water distribution pipeline system for fire fighting. The fire hydrant 11 is equipped with a manual shut-off valve (not shown) located within the hydrant body above the level of grade G. When the fire protection system is pressurized, the water level and hydrostatic pressure will extend into the hydrant body. This arrangement is known in the trade as a wet barrel hydrant.

Referring to FIG. 2, the dual valve apparatus 10 of the present invention includes a check valve of the flapper-type comprising a valve body 13 with an inlet port 14 for connection to the piping or hydrant riser 12 and an outlet port 15 for connection to the hydrant 11 thereby defining a flow passageway (represented by the arrow at 41) through the valve body 13. The dual valve apparatus 10 also includes a valve member 16 of the flapper-type pivotally mounted in the valve body and disposed out of the flow passageway, a valve seat 17 and a pressure relief valve 18 mounted on the valve member 16. The valve member 16 is pivotal from a position out of the flow passageway as shown in FIG. 2 to a closed position against the valve seat 17 as shown in FIG. 4.

The apparatus of the present invention preferably has a resisting means of dash-pot assembly 19 housed in a chamber 21 lateral to the flow passageway 41. The valve body 13 is provided with wall structure 22 which defines the chamber 21, the chamber 21 being open to the valve body 13. The dash-pot assembly 19 acts between the valve body 13 and the valve member 16 to permit controlled valve closure action of the valve member 16.

The pressure relief valve 18 has a body 23, a valve seat 24, a valve member 25, and a spring loading means 26 for holding the valve member 25 in the valve seat 24. The spring loading means 26 permits the valve member 25 to be yieldably urged out of the valve seat 24 serving to bypass water in the valve body 13 through the closed valve member 16 in response to hydraulic surge pressure substantially greater than the normal pressure in the piping or hydrant riser 12 as shown in FIG. 4.

The preferred structure of the valve body 13 is shown in FIGS. 2, 3 and 4. The valve body is preferably a casting including upper and lower end structures 27 and 28 united to curved side wall structure 29, all of which unite to the end wall structure 30 which unites with the tubular wall structure 22 of the lateral chamber 21 and which is closed by an end cap 31. Preferably, the valve body is cast in cast iron and the remaining parts are cast in either ductile iron, stainless steel, or bronze. An alternative form of construction is by welding.

The bottom end structure 28 of the valve body 13 is adapted to be connected and bolted to a flange 32 of the piping or hydrant riser 12. The top end structure 27 is united with a central collar 33 which is united to a standard flange 34 and is reinforced with gussets 36. To connect the hydrant 11 with the valve apparatus 10, a break-away connecting structure 35 is used. This serves to define the plane of shear breakage if the hydrant is struck and acts to preserve both the structure of the hydrant and that of the underlying valve apparatus. The break-away flange 35 is generally of the type disclosed in U.S. Pat. No. 4,127,142 and functions in a similar manner.

Referring to FIG. 2, a preferred embodiment of the means for mounting and holding the valve member 16 out of the flow passageway is shown. The valve member 16 is pivotally mounted to one side of the valve body by means of a shaft 38 and lug 39. A spring 40 of the hairpin type acts between the top end structure 27 and the valve member 16 serving to bias the valve member 16 towards the flow passageway 41. A holding means or bar 42 secured to the break-away flange 35 and extending downwardly therefrom engages the valve member 16 holding it in a cocked position, against the bias of the spring 40, and out of the flow passageway.

The dash-pot mechanism 19 is mounted within the lateral chamber 21 of the valve body 13 and is united in a sliding connection at its outer end with the end cap 31 by means of a spaced pair of slotted ears 44 and cooperating sliding pin 45 received through a central lug 46 in the body of the dash-pot 19. The arrangement permits the dash-pot assembly to shift towards the flow passageway 41 the distance of the slot 47 in response to action of the spring 40 upon the valve member 16 when the holding means 42 has been disengaged by breakage along the plane of flange 35 as shown in FIG. 3.

The dash-pot assembly 19 comprises a cylinder 49 with an internal piston 50 equipped with a piston rod 51 connected by a clevis 52 to a lug 53 on one side of the valve member 16. In a preferred arrangement of the dash-pot assembly, the piston chamber 54 can be charged through an orifice 56 in the cylinder 49. During charging, air and the like is discharged from the cylinder 49 through an orifice 59 on the opposite side of the piston 50. The ratio of orifice area 56 to piston area determines the restrictive rate of movement of the piston 50 when drawn along the cylinder 49 by the force of water acting upon the valve member 16, once the dash-pot assembly has been shifted into active position by the action of the spring 40 as shown in FIG. 3.

The structure described above is a greatly improved automatic valve mechanism for a wet barrel hydrant which controls the valve member 16 by means of dash-pot mechanism 19, once the valve member has been released from holding means 42 and which minimizes surge pressure after closure of the valve member 16 by means of a pressure relief valve 18 mounted on the valve member 16. The closure of the valve member 16 is controlled by the resistance of the dash-pot to upward movement of the valve member 16 due to the water pressure exerted on the valve member by the sudden flow of water through the flow passageway when the hydrant has been broken away from the check valve body. Through suitable selection of the orifice 56 area in the dash-pot, closure rates sufficient to reduce most water hammer in the system lines can be achieved. Virtually all water hammer in the lines is reduced by the additional action of the pressure relief valve when the valve member closes. For example, on a 110 psi static pressure system, the automatic check valve disclosed in U.S. Pat. No. 4,127,142 with a dash-pot assembly for controlled closure of the valve member created a water hammer of about 280 to 300 pounds per square inch when the check valve member closed, whereas on a 112 psi static pressure system, the dual valve apparatus of the present invention with a spring-loaded pressure relief mounted on the check valve member created a maximum water hammer of only 168 pounds-per-square inch when the check valve member closed.

The dual valve apparatus of the present invention is also useful in any pipeline for controlling hydraulic flow of liquid under pressure.

Referring to FIGS. 3 and 4, the dual valve apparatus of the present invention is shown in operation. Referring to FIG. 3, the break-away flange 35 has been knocked from the installed position upon the top flange 34 of the valve body 13 as shown in FIGS. 1 and 2. The hydrant 11 carries with it the break-away flange 35 and the holding means 42. The spring 40 urges the valve member 16 into the position shown in FIG. 3 and also pulls the dash-pot assembly 19 along the slot 47 to the position shown in FIG. 3. At this position, the dash-pot assembly 19 becomes active in response to water pressure against the valve member 16 due to the sudden flow of water through the flow passageway in the valve body 13. The dash-pot assembly 19 resists rapid closure of the valve member 16 as water is discharged from the orifice 56 of the cylinder 49 in response to the movement of the piston 50.

When the valve member 16 reaches the closed position shown in FIG. 4, the pressure relief valve 18 is activated. The hydraulic surge pressure created as a result of closure of valve member 16 forces the valve member 25 out of its seat 24 serving to bypass the water in the valve body 13 through the closed valve member 16 until the hydraulic surge pressure is no longer greater than the normal pressure in the piping or hydrant riser 12, at which time the valve member 25 is urged back into its seat by spring loading means 26. The action of the pressure relief valve when the valve member 16 is in the closed position minimizes surge pressure in the piping and thus prevents damaging water hammer in the system lines. In a preferred embodiment, the action of the dash-pot assembly means permitting controlled valve closure and the pressure relief valve are combined enabling the apparatus of the present invention to safely reduce water hammer created in the pipeline system.

A witness hole 61 may be provided in valve member 25 to permit a stream of water to spurt forth from the valve body 13 so that passers-by will recognize the damaged hydrant and notify the authorities to come repair the condition. The witness hole 61 functions to notify passers-by of the damaged condition after the pressure relief valve has closed.

It will be apparent to those having ordinary skill in the art that changes may be made in the details of the preferred embodiment disclosed above without departing from the spirit of the invention.

What is claimed is:

1. An apparatus for controlling hydraulic flow of water under pressure from piping connected to wet barrel hydrant, comprising a check valve of the swing flap type adapted to be connected between the piping and the hydrant, the check valve having a valve body with an inlet port for connection to the piping and an outlet port for connection to the hydrant defining a flow passageway therethrough, a valve seat in the valve body surrounding the flow passageway, a valve member of the flap type pivotally mounted in the valve body, the valve member being pivotable from a position out of the flow passageway to a closed position against the valve seat, means for holding the valve member in a position out of the flow passageway, the holding means being mounted upon breakaway structure active upon lateral impact to the hydrant serving to disengage the holding means from the valve member, spring means serving to bias the valve member towards the closed position, the valve body including a chamber disposed laterally of the flow passageway, dash-pot assembly means disposed in the chamber and acting between the valve body and the valve member to permit controlled valve closure action upon disengagement of the holding means from the valve member, connection means arranged between the dash-pot means and the valve body permitting the dash-pot means to move as a unit toward the flow passageway in response to movment of the valve member into the flow stream to commence a damping action upon the valve member for gradual closing of the valve, the spring means serving to pivot the valve member into the flow passageway for impingement with the fluid stream moving therethrough, a pressure relief valve mounted on the valve member serving to bypass the water in the valve body through the closed valve member in response to hydraulic surge pressure substantially greater than the normal pressure in the piping, thereby minimizing water hammer in the piping, and a hole provided in the valve member furnishing a witness stream of water when the check valve and the pressure relief valve are closed indicating the damaged condition of the hydrant.

2. An apparatus according to claim 1 wherein said pressure relief valve comprises a body having an inlet port and an outlet port defining a flow passageway therethrough, a valve seat in the body surrounding the flow passageway, a valve member, and spring loading means for holding the valve member in the valve seat, the spring loading means permitting the valve member to by yieldably urged out of the valve seat in response to hydraulic surge pressure substantially greater than the normal pressure in the piping.

* * * * *